United States Patent
Marinescu

(10) Patent No.: US 10,152,278 B2
(45) Date of Patent: Dec. 11, 2018

(54) LOGICAL TO PHYSICAL SECTOR SIZE ADAPTER

(71) Applicant: VMware, Inc., Palo Alto, CA (US)

(72) Inventor: Adrian Marinescu, Issaquah, WA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/465,497

(22) Filed: Mar. 21, 2017

(65) Prior Publication Data
US 2018/0275916 A1   Sep. 27, 2018

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0656* (2013.01); *G06F 3/0685* (2013.01)

(58) Field of Classification Search
CPC ...... G06F 3/0613; G06F 3/064; G06F 3/0656; G06F 3/0659; G06F 3/0685
See application file for complete search history.

(56) References Cited

U.S. PATENT DOCUMENTS

| | | | | |
|---|---|---|---|---|
| 8,006,027 | B1* | 8/2011 | Stevens | G06F 3/061 711/111 |
| 2009/0300288 | A1* | 12/2009 | Lefebvre | G06F 12/0804 711/128 |
| 2014/0032836 | A1* | 1/2014 | Pan | G06F 11/108 711/114 |
| 2014/0289456 | A1* | 9/2014 | Simha | G06F 11/141 711/103 |
| 2014/0304452 | A1* | 10/2014 | de la Iglesia | G06F 12/0246 711/103 |
| 2014/0337562 | A1* | 11/2014 | Long | G06F 3/0659 711/103 |
| 2016/0147442 | A1* | 5/2016 | Baderdinni | G06F 3/061 711/105 |
| 2016/0313919 | A1* | 10/2016 | Chambliss | G06F 3/0604 |
| 2017/0177276 | A1* | 6/2017 | Delaney | G06F 3/0656 |
| 2018/0060232 | A1* | 3/2018 | Oshinsky | G06F 12/0804 |

* cited by examiner

*Primary Examiner* — Hal Schnee

(57) ABSTRACT

The present disclosure describes processing a write command directed to a block-based main storage device, and having a target logical sector and write data. The processing may include writing an address of a physical sector in the main storage device that contains the target logical sector to a header portion of a scratch block stored in a byte-addressable storage. The write data may be written to a slot the scratch block. The scratch block may be committed a scratch block in persistent storage. Subsequent to processing the write command, a write completion response may be signaled to the sender of the write command to indicate to the sender completion of the write command, without having committed the write data to the main storage device. Write data from several write commands may be subsequently committed to the main storage device.

20 Claims, 8 Drawing Sheets

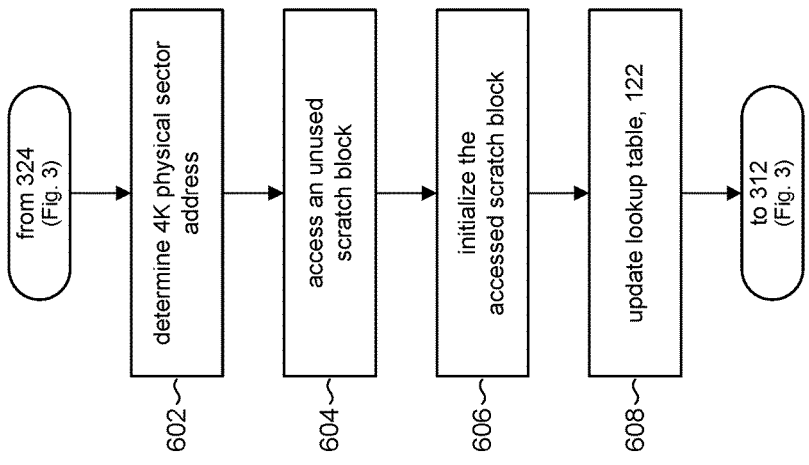
Fig. 6
Fig. 5
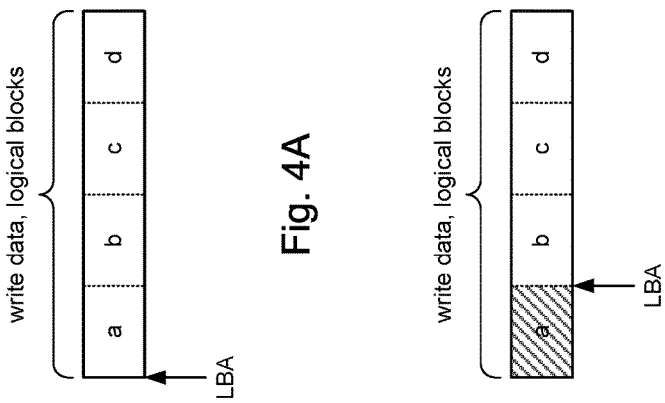
Fig. 4A
Fig. 4B

LOGICAL TO PHYSICAL SECTOR SIZE ADAPTER

BACKGROUND

The physical storage media of a hard disk drive (HDD) is divided into units called physical sectors. Data on a hard disk drive is written and read in minimum units of physical sectors. As such, hard disk drives may be referred to as block-based devices. By comparison, byte-addressable memories (e.g., RAM, random access memory) allow individual bytes of data to be written and read. Industry standard disk drives have used a native (physical) 512 bytes (B) sector size for decades. However, due to the increasing demand for larger capacities, the storage industry has introduced new advanced formats that use 4 KB (4096 bytes) physical sectors.

Storage devices with a native sector size of 4 KB have become increasingly more popular over the last few years. However, many aspects of computer systems have been designed assuming physical sector sizes of 512 B. Although some operating systems (OSs) have been rewritten for native 4 KB storage devices, oftentimes upgrading existing software systems may require application changes that involve complex compatibility issues in mixed configurations, require upgrade paths that are logistically challenging and disruptive to an organization, incur costs in terms of manpower, time, and money, and so on. Accordingly, legacy systems have been slow in adapting to the advanced format.

To ease the transition, solutions typically involve a technique sometimes referred to as 512-byte emulation (512e) in order to allow legacy systems to use 4 KB native storage while avoiding time-consuming, expensive, and error-prone changes to such systems. 512-byte emulation allows a system to perform I/O using 512 B logical sectors, but which in reality take place on 4 KB physical sectors. Typically, 512-byte emulation involves read-modify-write (RMW) operations when doing write operations. In order to write a 512-byte logical sector onto a 4 KB native storage device, a read operation is performed to read in the 4 KB block of data from the 4 KB physical sector of storage device that contains the 512-byte logical sector. The 512-byte logical sector is written to the appropriate location in the 4 KB block that was read in (modify operation), followed by a write operation of the 4 KB block back to the 4 KB physical sector. It can be appreciated that 512e is susceptible to latency and lower throughput due to the additional I/O.

For the cases where transactions are not required, usually caches can avoid the overhead of RMW, by reducing the number of I/Os. For transactional applications such as databases and file systems implementations, this is not really an option. If the persistence is not guaranteed when the application relies on it, corruptions and unpredictable execution can follow power failures or OS crashes. To guarantee that a write operation becomes persistent when the call completes, conventional approaches typically need for the data to be committed (written) on the physical storage device. If the logical sector size is smaller than the physical sector size, RMW can triple the latency of the write operation, assuming that the reads and writes have similar latency. In the worst-case scenario for HDDs, with competing I/O operations from other threads in the system, RMW may be impacted due to the resulting additional seeks on the HDD by the other threads.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 4A and 4B illustrate an example of incrementing an LBA during processing of a write command.

FIG. 5 illustrates an example of a lookup table.

FIG. 6 illustrates a flow to allocate a scratch block.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
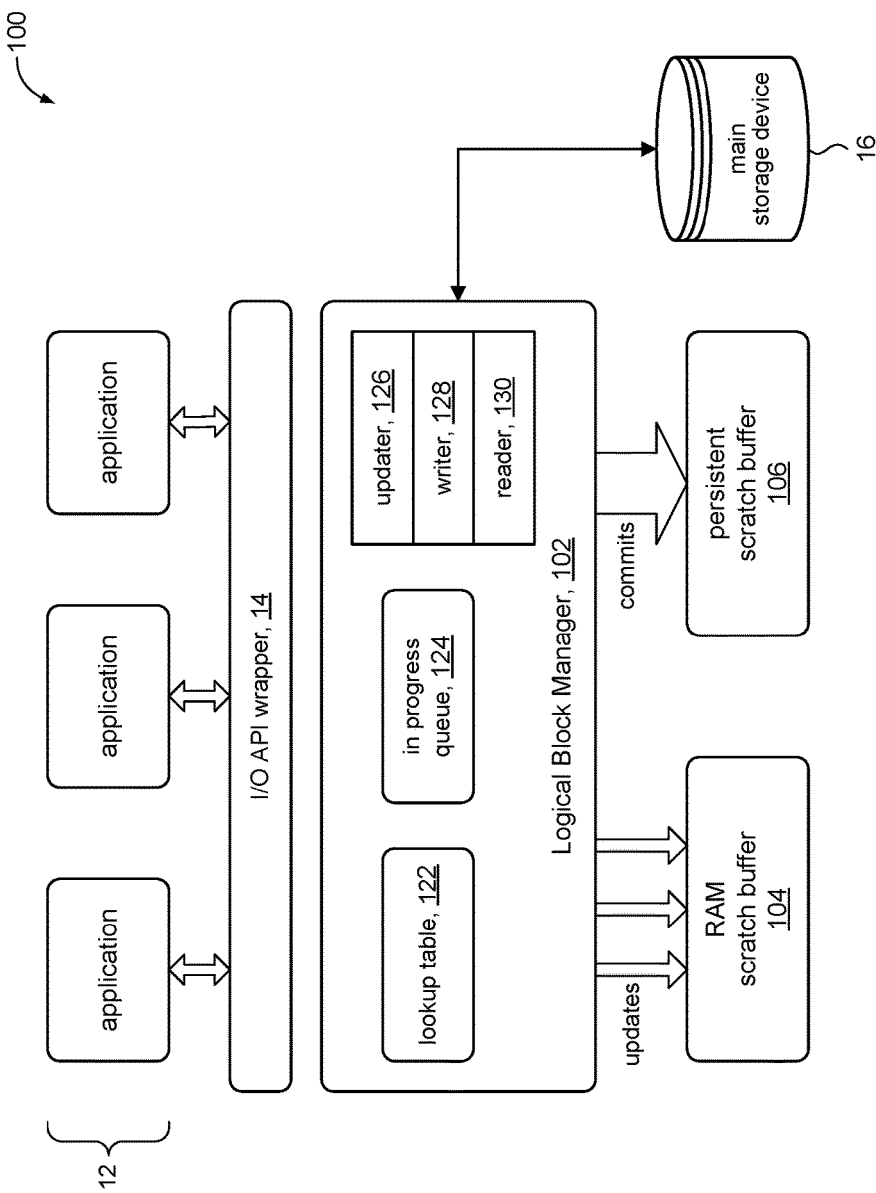
FIGS. 1 and 1A illustrate embodiments of a computing system in accordance with the present disclosure.

FIG. 1 shows a computing system 100 that may incorporate an embodiment for sector conversion between logical sectors and physical sectors in a block-based storage device, in accordance with the present disclosure. Block-based storage refers to any storage device that transfers (read, write) data in a block of bytes (commonly referred to as a physical sector) as a minimum unit of transfer. In addition, write operations are "atomic" in that the block data is entirely written to the physical sector, or not at all; a physical sector is not partially written. The physical sector size may be 512 bytes, 4 KB bytes, and so on. Block-based devices include storage devices such as hard disk drives (HDDs), NVMe devices, solid state drives (SSDs, flash memories), and the like. By comparison, byte-addressable storage refers to storage architectures that support accessing individual bytes of data, such as DRAM, SRAM, and the like.

The computing system 100 may include one or more applications 12 that can access data from a block-based main storage device 16. In some embodiments, the applications 12 may be user applications, database applications, and the like. In other embodiments, the computer system 100 may be a component in a virtualization system. For example, an applications 12 may be hypervisors executing in the virtualization system, virtual machines executing in the virtualization system, and so on.

The main storage device 16 may be any suitable block-based storage device, such as HDD, SSD, NVMe storage, and so on. In some embodiments the main storage device 16 may be a single storage device, and in other embodiments the main storage device 16 may comprise a system of several storage devices. In a particular embodiment, for example, the main storage device 16 is an NVMe storage device. The computing system 100 may include an I/O application programming interface (API) 14 to provide the applications 12 with a programmatic interface to issue read and write commands for I/O with the main storage device 16.

In some embodiments, the applications 12 may perform read and write operations using 512 byte (B) logical sectors. The main storage device 16, on the other hand, may be configured with 4 KB sized physical sectors. The computing system 100 in accordance with the present disclosure may include a logical block manager 102 to convert between 512 B logical sectors and 4 KB physical sectors. The logical block manager 102 may include a lookup table 122 and an in-progress queue 124 to manage the conversion. The logical block manager 102 may further include an updater module 126, a writer module 128 to perform various aspects of the conversion, and a reader 130 to service read commands.

A RAM scratch buffer 104 may serve as an auxiliary data store to process write commands and to record transacted write operations. In accordance with the present disclosure, the RAM scratch buffer 104 may be any suitable byte-addressable data store. In some embodiments, for example, the RAM scratch buffer 104 may be allocated from the system memory (e.g., 914, FIG. 9) of computer system 100. In other embodiments, the RAM scratch buffer 104 may comprise byte-addressable memory separate from the system memory.

Figure 1A:
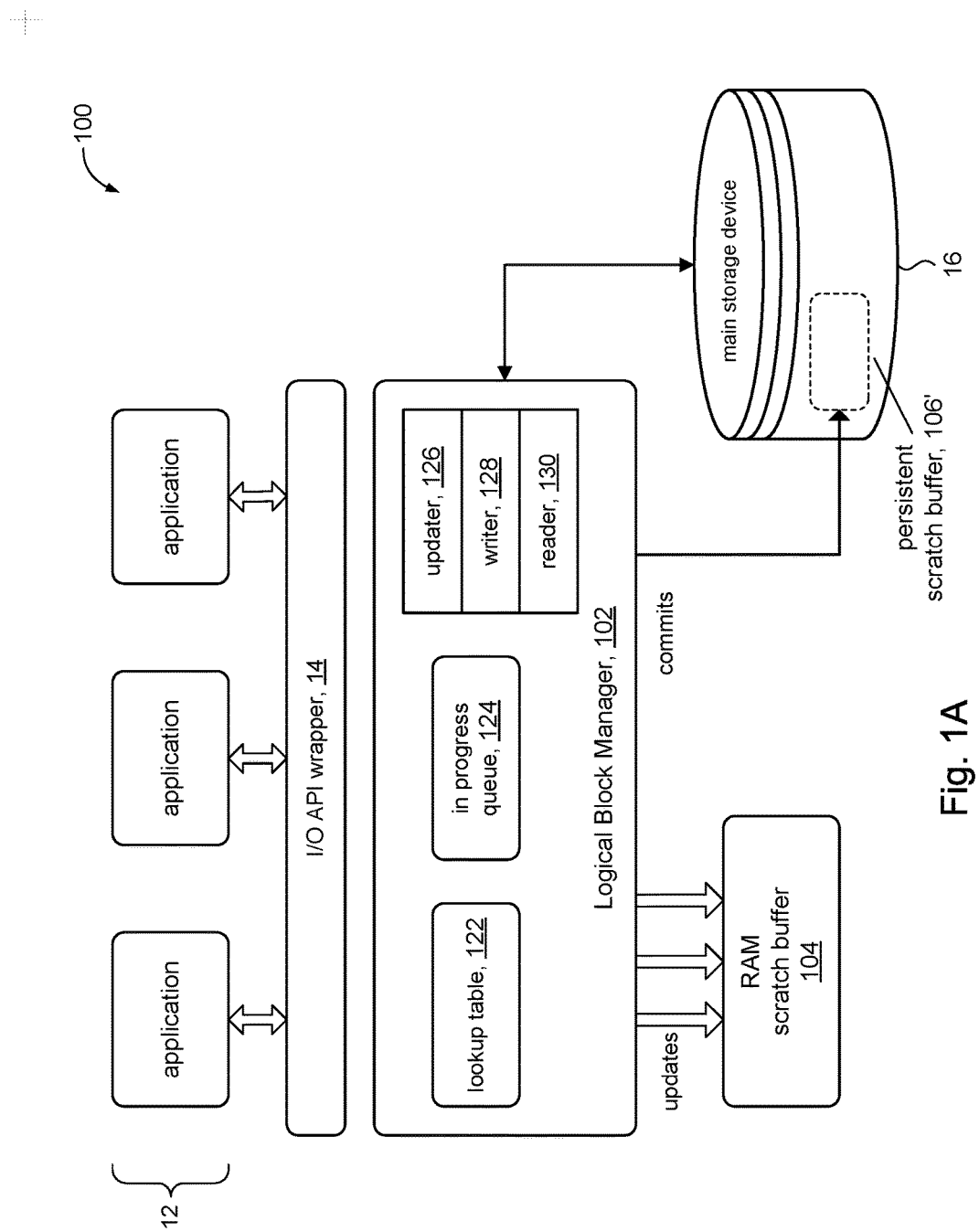

A persistent scratch buffer 106 may serve as an auxiliary data store to commit transacted write operations. In accordance with the present disclosure, the persistent scratch buffer 106 may be any suitable persistent data store. The persistent scratch buffer 106 may be a block-based device or byte-addressable storage. In some embodiments, the persistent scratch buffer 106 may be data storage device separate from the main storage device, such as depicted in FIG. 1. Referring for a moment to FIG. 1A, in other embodiments, the persistent scratch buffer 106' may be allocated from the main storage device 16 and configured with physical sectors having the same size as the physical sectors of the main storage device 16. For example, the persistent scratch buffer 106' may be a separate partition defined on the main storage device 16.

The persistent scratch buffer 106 may be viewed as an extension of the main storage device 16 to track write operations which have not yet been committed to main storage device 16. Both of them taken together should reflect a consistent view of main storage device 16 with similar persistence guarantees as if the main storage device 16 was defined with a 512 B physical sector size. For instance, it is possible that at any moment a physical sector on the main storage device 16 does not have the latest 512 B sector content in place, but for sure, if the write call completed, that content should be on the persistent scratch buffer 106. The state of the persistent scratch buffer 106 can be used to reconstruct, entirely, the state that was not yet committed to the main storage device 16. When the system is initialized after a reboot or if the system is in a recovery process from a previous crash, the persistent scratch buffer 106 may be parsed and fetched in the logical block manager 102, which should reflect exactly the state that was committed.

In some sense, the persistent scratch buffer 106 may be viewed as a sequential transactional log. The persistent scratch buffer 106 can ensure that for any logical sector write, the corresponding content is committed. In case of crashes, the persistent scratch buffer 106 may be used to reconstruct the last consistent state. Nevertheless, it is not a "traditional" sequential transactional log, being designed instead to minimize its footprint by:

Compacting logical sectors (blocks) that belong to the same physical sector (block) on the main storage device 16 to be on the same physical sector on the persistent scratch buffer 106. The same slot is updated for writes to the same logical block.

Actively reusing entries as soon as they are written back to the main storage device 16.

For purposes of explanation only, the following configuration may be assumed without loss of generality. The main storage device 16 may be assumed to be configured with 4 KB physical sectors. Likewise, the persistent scratch buffer 106 may be block-based storage configured with 4 KB physical sectors. For example, in some embodiments, the persistent scratch buffer 106 may be allocated from the main storage device 16. In other embodiments, the persistent scratch buffer 106 may be a block-based flash memory device (separate from the main storage device 16) configured to with 4 KB blocks. The applications 12 may be designed around a block I/O size of 512 B. Accordingly, the smallest unit of write data that the main storage device 16 will process can be assumed to be 512 B. This unit of size may be referred to as the logical sector size.

Figure 2:
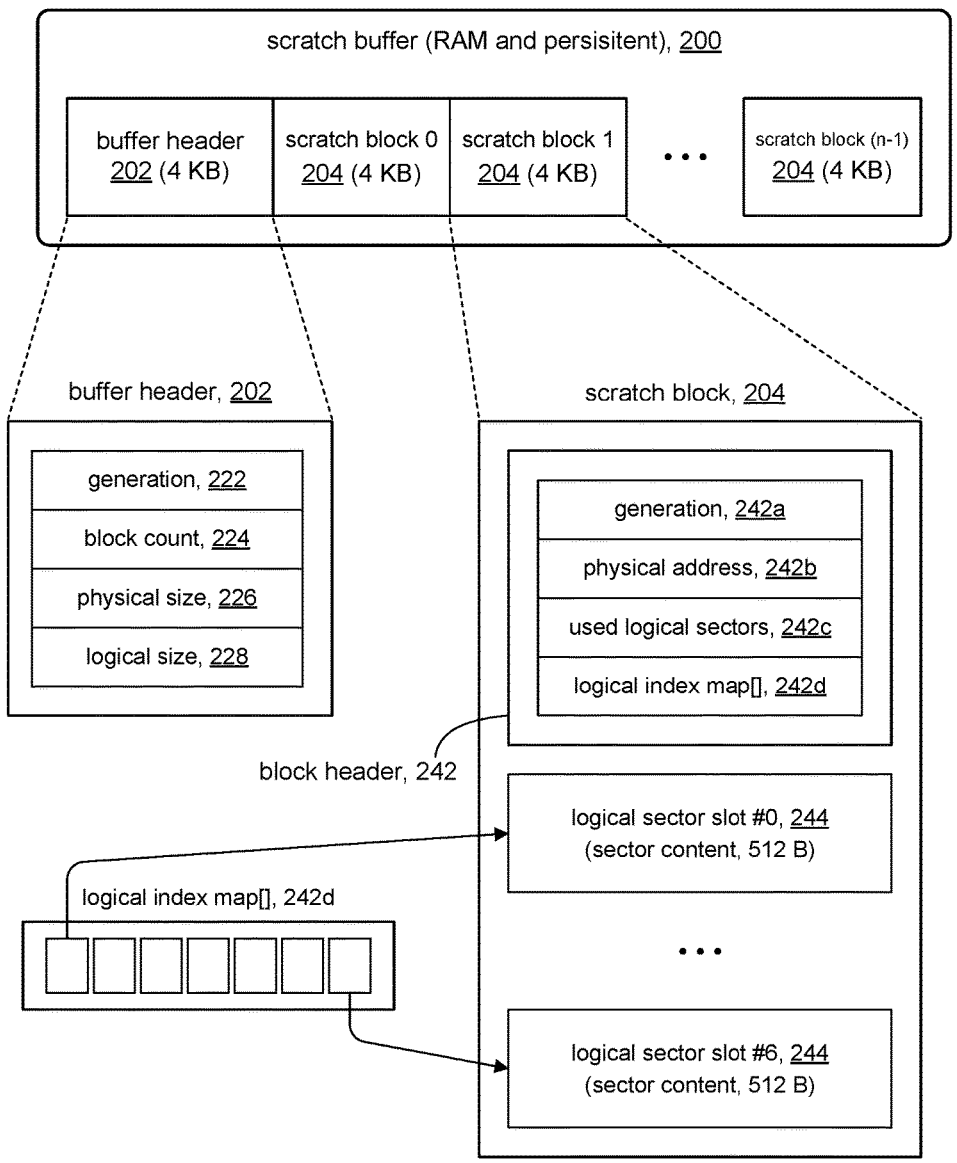
FIG. 2 illustrates an example of a scratch buffer in accordance with some embodiments of the present disclosure.

The discussion will now turn to FIG. 2. In some embodiments, the structure of the RAM scratch buffer 104 and the structure of the persistent scratch buffer 106 may be the same. FIG. 2, for example, illustrates a scratch buffer structure 200 in accordance with some embodiments of the present disclosure; this structure describes the structure of the RAM scratch buffer 104 and the structure of the persistent scratch buffer 106. The scratch buffer 200 may comprise a buffer header 202 and a set of n scratch blocks 204, where n is the number of scratch blocks 204 in the scratch buffer 200. Each scratch block 204 may be identified by a cardinal number; for example, scratch block 0, scratch block 1, and so on to scratch block (n−1).

The buffer header 202 and the scratch blocks 204 may comprise 4 KB blocks to accommodate the 4 KB size of the physical sectors that comprise the persistent scratch buffer 106. The buffer header 202 may comprise data fields including a generation field 222, a block count 224, a physical size designator 226, and a logical size designator 228. The remaining undefined space in the 4 KB buffer header 202 may be used for other information. As will be explained in more detail below, the generation field 222 may serve to coordinate the process of committing data to the main storage device 16. The block count 224 indicates the number n of scratch blocks 204 in the scratch buffer 200. The physical size designator 226 represents the size of the physical sectors of the main storage device 16. The logical size designator 228 represents the smallest logical unit of data (e.g., 512 B) that the applications 12 perform I/O with.

The scratch blocks 204 reflect the updates (writes) made to the logical sectors that comprise the physical sectors of the main storage device 16. When an update is made to a given physical sector on the main storage device 16 vis-à-vis a logical sector, a scratch block 204 may be allocated and associated with that physical sector. Writes to other logical sectors in that physical sector may be stored in the same scratch block 204.

Each scratch block 204 may include a block header 242 and several logical sector slots 244. The block header 242 may store information to manage its corresponding scratch block 204. The logical sector slots 244 store the actual data for the logical sectors in the associated physical sector. For 512 B logical sectors, each 4 KB scratch block 204 may be divided into eight 512 B data blocks, one data block is for the block header 242 and the remaining seven data blocks are for the logical sector slots 244. Thus, the seven logical sector slots 244 in a scratch block 204 can store updates (writes) to seven of the eight 512 B logical sectors that comprise a given 4 KB physical sector of the main storage device 16. If a write occurs for the eighth logical sector, that logical sector may be stored in the logical sector slot 244 of another scratch block 204; the remaining six logical sector slots in that additional scratch block 204 remain unused. Processing that involves the eighth logical sector will include accessing the additional scratch block that contains the eighth logical sector. This additional access will be understood to apply in the processing flows discussed below, and thus will not be repeated to avoid unduly complicating the discussion.

The block header 242 may include a generation field 242a to track and coordinate updates to the main storage device 16 so that every scratch block 204 is associated with a generation number. These generation numbers, along with generation field 222 in the buffer header 202, serve to coordinate the process of committing data to the main storage device 16, which is discussed in more detail below.

The block header 242 may include a physical address 242b, which identifies the physical sector on the main storage device 16 that the scratch block 204 is associated with. The logical addressing of physical sectors on the main storage device 16 may begin with 0 for the first physical sector, 1 for the second physical sector, (m−1) for the $m^{th}$ physical sector, and so on.

The block header 242 may include a used logical sectors counter 242c, which maintains a count of the logical sectors in the given physical sector that have been updated (written to). The logical index map 242d may be a vector (LogicalIndexMap[ ]) of entries that correspond to each logical sector slot 244. Each entry in the logical index map 242d may identify the logical sector in the given physical sector for which the corresponding logical sector slot 244 contains data. In some embodiments, a logical sector may be identified by its position within the given physical sector. For example, the first logical sector in a physical sector may be position 0, the second logical sector may be position 1, and so on to position 7 which is the last logical sector.

The following simplified example may be instructive on the use of the logical index map 242d. Suppose an application 12 writes data to logical sector 2. The physical sector on the main storage device 16 that contains logical sector 2 has a physical address of 0. In other words, the physical sector at physical address 0 contains logical sectors 0-7, and logical sector 2 would be the third logical sector. The physical address 242b will be 0. Assuming this is the first update, the data will be stored in the first logical sector slot 244, namely logical sector slot #0, and entry LogicalIndexMap[0] in the logical index map 242d will contain the value '2' to indicate that logical sector slot #0 contains data for and corresponds to logical sector 2. Suppose now that the application 12 writes to logical sector 5, which is still in physical sector 0. The data will be stored in the next logical sector slot 244, namely logical sector #1, and the entry LogicalIndexMap[1] in the logical index map 242d will contain the value '5' to indicate that logical sector slot #1 corresponds to logical sector 5. If the application 12 then writes new data to logical sector 2, that data will be stored in logical sector slot #0 since logical sector 2 has already been written to; in other words, logical sector slot #0 is reused and its content is overwritten.

Figure 3:
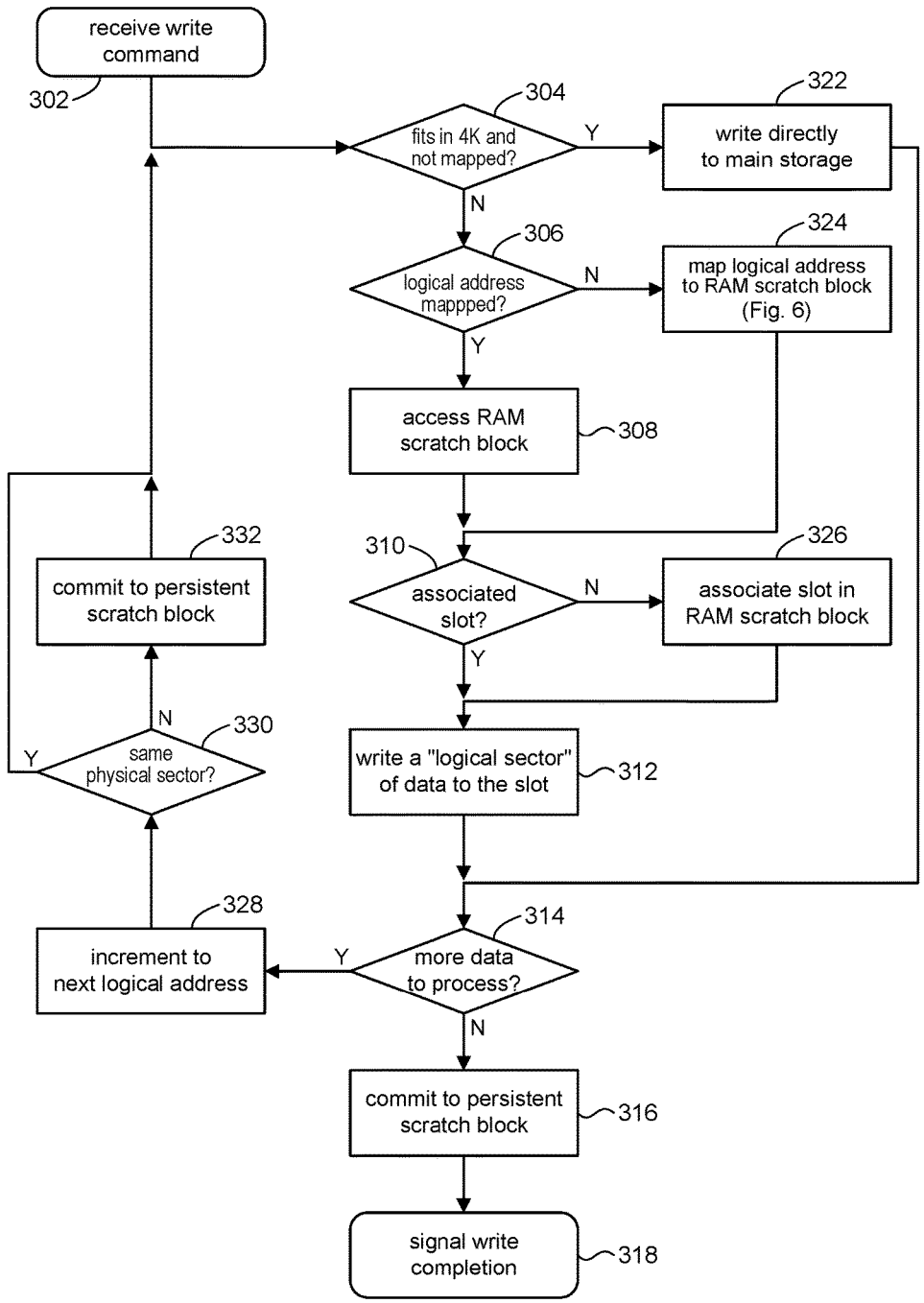
FIG. 3 illustrates a flow to process a write command in accordance with some embodiments of the present disclosure.

Referring to FIG. 3, the discussion will now turn to a high level description of processing in the logical block manager 102, and in particular the writer module 128, for managing logical sectors in accordance with the present disclosure. In some embodiments, for example, the logical block manager 102 may include computer executable program code, which when executed by a computer system (e.g., 902, FIG. 9), may cause the computer system to perform the processing in accordance with FIG. 3.

At block 302, the logical block manager 102 may receive a write command, for example, from an application 12. The write command may specify a write address of the target logical sector (the logical sector to be managed) on the main storage device 16, which may be expressed as a logical block address (LBA). The write command may further include corresponding write data to be stored beginning with the target logical sector specified by the LBA. As explained above the main storage device 16 may comprise 4 KB physical sectors. Each physical sector may comprise eight 512 B logical sectors. Each logical sector may be associated with a unique logical block address that starts from 0 and goes up to (n−1), where n is the number of logical sectors on the main storage device 16. Accordingly, the write data may be viewed as comprising one or more logical blocks of write data to be stored in sequential corresponding logical sectors on the main storage device 16.

At block 304, the logical block manager 102 may determine whether the write data fits in a 4 KB physical sector of the main storage device 16, in which case the write data may be written directly to the main storage device 16 without having to be managed in the scratch buffers 104, 106. In some embodiments, for example, the write data may be deemed to "fit" a 4 KB physical sector of main storage device 16 when the write data comprises eight logical blocks of data and the LBA specified in the write command is aligned to the first logical sector of a physical sector. For example, an LBA of 0 is aligned with a physical sector (namely, physical sector 0), while an LBA of 3 is not aligned with any physical sector. More generally, for the illustrative configuration assumed, an LBA may be deemed to be "aligned" with a physical sector if the LBA is an integral power of 8. The logical block manager 102 may determine that the write data does not fit in a 4 KB physical sector and proceed to block 306 in response.

On the other hand, the logical block manager 102 may determine that the write data fits in a 4 KB physical sector of the main storage device 16, and in response may make a further determination whether any logical sectors in the given physical sector are being managed in the scratch buffers 104, 106. If any such logical sectors are being managed, then the write data cannot be written directly to the main storage device 16 because the write data can be overwritten by the older data in the managed logical sectors when a scheduled round of updates is performed (FIG. 8) or a round of updates occurs after recovery from a system crash.

In some embodiments, the logical block manager 102 may use the lookup table 122 (FIG. 1) to determine whether or not a logical sector is being managed. A logical sector is "managed" if its LBA is already mapped to a scratch block 204 in the RAM scratch buffer 104 vis-à-vis the lookup table 122. FIG. 5 shows details of the lookup table 122 in accordance with some embodiments. If a logical sector has been previously written to, then its LBA will appear in the logical block address column of the lookup table 122. The scratch block number column in the lookup table 122 identifies the scratch block in the RAM scratch buffer 104. The LBA is deemed to be "mapped" to a scratch block, and the logical sector is deemed to be managed. FIG. 5 shows, for example, that LBA 107 is mapped to scratch block #1 in the RAM scratch buffer 104, LBA 35 is mapped to scratch block #4, and so on.

Using the lookup table 122, the logical block manager 102 may determine that none of the logical sectors in the 4 KB physical sector are being managed, and proceed to block 322 in response. On the other hand the logical block manager 102 may determine that one or more of the logical sectors in the 4 KB physical sector are being managed, and proceed to block 306 in response.

At block 306, the logical block manager 102 may determine whether or not the LBA specified in the write command is already mapped to a scratch block 204 in the RAM scratch buffer 104. In accordance with some embodiments, the logical block manager 102 may process the write data one logical block at a time. Consider the example shown in FIG. 4A, where the write command specifies an LBA and includes four logical blocks of write data. The specified LBA initially points to the first logical block a to be processed (i.e., logical block a is targeted to be stored in a logical sector specified by the LBA). After processing logical block a, the LBA will be incremented to point to subsequent logical blocks b, c, and d. The logical block manager 102 may use the lookup table 122 explained above to determine that the specified LBA is already mapped to a scratch block in the RAM scratch buffer 104 and proceed to block 308. On the other hand, the logical block manager 102 may determine that the specified LBA has not yet been mapped to a scratch block in the RAM scratch buffer 104 and proceed to block 324 in response.

At block 308, in response to a determination (block 306) that the specified LBA is already mapped to a scratch block 204 (the "target scratch block") in the RAM scratch buffer 104, the logical block manager 102 may access the block header 242 of the target scratch block. The logical block manager 102 may compute or otherwise determine the position number of the target logical sector (pointed to by the specified LBA) within the physical sector on main storage device 16 that contains the specified LBA. The physical address field 242b in the block header 242 contains the address of that physical sector. In some embodiments, the position number of the target logical sector may be determined by multiplying the value in the physical address field 242b by '8' and subtracting the product from the specified LBA. Thus, for example, a logical sector at LBA 128 is contained in a physical sector whose physical address is 16, and the position of that logical sector within the physical sector is position 0 (128−16×8=0), where position numbering begins with '0'. As another example, a logical sector with LBA 243 is contained in physical sector 30 and is in position 3 (243−30×8=3), and so on.

At block 310, the logical block manager 102 may determine whether or not a logical sector slot 244 in the target scratch block in the RAM scratch buffer 104 is associated with the target logical sector. For example, the logical sector slot may not be associated with the target logical sector on the first write to the target logical sector. The situation can also arise when the target scratch block is a newly allocated scratch block (block 324). In some embodiments, this determination may be made using the position number of the target logical sector (determined in block 308). If the position number appears an entry in the logical index map 242d, the target logical sector is deemed to be associated with a logical sector slot. The logical block manager 102 may perform a search of logical index map 242d to make this determination, using the used logical sectors counter 242c to inform the logical block manager 102 how many entries to inspect. The logical block manager 102 may determine that a logical sector slot in the target scratch block in the RAM scratch buffer 104 is not yet associated with the target logical sector and proceed to block 326. On the other hand, the logical block manager 102 may determine that a logical sector slot in the target scratch block in the RAM scratch buffer 104 is associated with the target logical sector and proceed to block 312.

At block 312, the logical block manager 102 may write or otherwise store the write data into the logical sector slot that corresponds to the entry in the logical index map 242d that contains the position number of the target logical sector. Recall from FIG. 2 that each entry in the logical index map 242d has a corresponding logical sector slot 244.

At block 314, the logical block manager 102 may determine whether or not there is any more write data to process. For example, if the write data in the write command comprises an integer multiple of 8 logical blocks of write data, then each group of 8 logical blocks may be written directly to the main storage device 16 (block 322), with no data remaining to be written in the end. On the other hand, if the write data does not comprise an integer multiple of 8 logical blocks, then the logical blocks of write data may be processed one logical block at a time. The logical block manager 102 may use a counter (not shown) or other suitable tracking mechanism to keep track of how much of the write data in the write command has been processed. The logical block manager 102 may determine that all the write data has been processed and proceed to block 316. On the other hand, the logical block manager 102 may determine that there is additional data to be processed and proceed to block 328.

At block 316, in response to a determination (block 314) that all the write data has been processed, the logical block manager 102 may commit the target scratch block (in the RAM scratch buffer 104) to the persistent scratch buffer 106 in order to commit the data that was processed for the physical sector associated with the target scratch block. In some embodiments, for example, the logical block manager 102 may perform an update operation to overwrite a scratch block in the persistent scratch buffer 106 with the contents of the target scratch block in RAM scratch buffer 104. For example, the logical block manager 102 may identify a scratch block in the persistent scratch buffer 106 by looking for a scratch buffer whose generation number (generation field 242a) is less than the generation number shown in the buffer header portion 202 of the persistent scratch buffer 106. As explained below in connection with FIG. 8, if the generation numbers are equal, that indicates the scratch block in persistent scratch buffer 106 has not yet been committed to main storage device 16 and thus should not be overwritten. A lower generation number indicates the scratch block has already been committed to main storage device 16 and thus may be overwritten with content from the target scratch block. In accordance with the present disclosure, the update operation may be an atomic write operation, in which either (a) all 4 KB of data in the target scratch block is written to the corresponding scratch block in the persistent scratch buffer 106 or (b) not at all. In some embodiments, the persistent scratch buffer 106 may comprise a native 4 KB block-based storage device, so that the atomic write is ensured by operation of the block-based storage device.

At block 318, the logical block manager 102 may generate a signal indicating completion of the write command, which can then be communicated back to the application 12. For example, the write completion signal may be the return code of the write command function call.

It can be appreciated from the foregoing that processing of a write command in accordance with the present disclosure can be completed without performing a RMW sequence or operation, thus reducing the time to perform a write command. For example, where the write data is aligned to (fits) a 4 KB physical sector, the logical block manager 102 can complete the write command by overwriting the entire target physical sector on main storage device 16, and thus avoids the time for an RMW sequence. Where the write data is not aligned with a 4 KB physical sector, the logical block manager 102 can complete the write command (as far as the application 12 is concerned) by storing the data in a scratch block in the RAM scratch buffer 104 and atomically committing that a scratch block to the persistent scratch buffer 106. The atomic write to the persistent scratch buffer 106 guarantees that the write operation is durable, even though the write data has not yet been committed to the main storage device 16 (an aspect of the present disclosure which will be discussed below). The RAM scratch buffer 104 serves as a cache for subsequent read commands on data that was previously written but not yet committed to the main storage device 16, another aspect of the present disclosure which will be discussed below.

Continuing with FIG. 3, at block 322, in response to a determination (block 304) that the write data does fit a 4 KB physical sector in the manner described above, the logical block manager 102 may store the write data directly to a target physical sector on main storage device 16, rather than processing the write data using the scratch buffers 104, 106. Since the aligned 4 KB of write data fits entirely within the target physical sector on the main storage device 16, the target physical sector can be written to without an RMW sequence. Accordingly, the write data can be stored directly to the main storage device 16 without incurring the performance hit of an RMW sequence. Processing may continue at block 314.

At block 324, in response to a determination (block 306) that the specified LBA has not yet been mapped to a scratch block in the RAM scratch buffer 104, the logical block manager 102 may map the logical address to a scratch block from the RAM scratch buffer 104, which is explained in FIG. 6. At the end of the process, a target scratch block in the RAM scratch buffer will have been identified, and processing may continue at block 310.

At block 326, in response to a determination (block 310) that a logical sector slot in the target scratch block in RAM scratch buffer 104 is not yet associated with the target logical sector, the logical block manager 102 may access the block header portion 242 of the target scratch block and increment the used logical sectors counter 242c to indicate that another logical sector slot 244 has been allocated. The position number (block 308) of the target logical sector may be stored in the next empty entry in the logical index map 242d, thus associating the logical sector slot that corresponds to the entry with the target logical sector. Processing may continue at block 312.

At block 328, in response to a determination (block 314) that there is additional write data to be processed, the logical block manager 102 may increment the LBA to point to the next logical block of write data to be processed. Consider the example shown in FIG. 4A, where the write command specifies an LBA and includes four logical blocks of write data. The specified LBA initially points to the first logical block a to be processed. After processing logical block a, the LBA may be incremented as shown in FIG. 4B to point to the next logical block b for processing. Although not shown, in the case where an aligned 4 KB block of write data is processed (block 322), the LBA can be incremented by '8' to skip to the next logical block of write data to be processed.

At block 330, the logical block manager 102 may determine whether or not the incremented LBA points to a logical sector in the same physical sector. For example, if the LBA was 127 (last logical sector in physical sector 15), then the incremented LBA would be 128 which now points to a logical sector in physical sector 16). The logical block manager 102 may determine that the incremented LBA is an address in the same physical sector and proceed to block 304. On the other hand, the logical block manager 102 may determine that the incremented LBA is an address in a different physical sector and proceed to block 332 to process additional write data in the write command received in block 302.

At block 332, in response to a determination that incremented LBA is an address in a different physical sector, the logical block manager 102 may commit the target scratch block (in the RAM scratch buffer 104) to the persistent scratch buffer 106 in order to commit the data that was processed for the current physical sector associated with the target scratch block in RAM scratch buffer 104. This process is described in connection with block 316. Processing may then proceed to block 304 to process the additional write data.

Referring to FIG. 6, the discussion will now turn to a high level description of processing in the logical block manager 102 for mapping a logical block address to a scratch block in accordance with the present disclosure (block 324). In some embodiments, for example, the logical block manager 102 may include computer executable program code, which when executed by a computer system (e.g., 902, FIG. 9), may cause the computer system to perform the processing in accordance with FIG. 6.

At block 602, the logical block manager 102 may compute or otherwise determine the physical address of a target physical sector on main storage device 16 that contains the LBA specified in the write command (block 302). In the assumed configuration of 4 KB physical sectors and 512 B logical sectors, the physical address that spans the specified LBA may be determined by dividing the LBA by 8 (e.g., right shifting the binary representation of the LBA by three positions) and ignoring any remaining portion (i.e., consider only on the integer portion). For example, an LBA of 512 is spanned by physical address 64. An LBA of 127 is spanned by physical address 15, and so on.

At block 604, the logical block manager 102 may allocate or otherwise access an unused scratch block 204 in the RAM scratch buffer 104. In some embodiments, for example, the logical block manager 102 may scan the list of scratch blocks in the RAM scratch buffer 104 to allocate a scratch block that has a lower generation number (generation field 242a, FIG. 2) than the generation number in the buffer header 202 (generation field 222, FIG. 2) of the RAM scratch buffer 104. A scratch block whose generation number is the same as or greater than in the buffer header is deemed to contain 'current' data that has not yet been committed to main storage device 16 and thus cannot be reused. On the other hand, a scratch block whose generation number is less than in the buffer header is deemed to have already been committed to main storage device 16 and thus can be reused. The generation number is discussed in more detail below in connection with FIG. 8.

At block 606, the logical block manager 102 may initialize the new scratch block 204. For example, the logical block manager 102 may copy the generation field 222 stored in the buffer header 202 of the RAM scratch buffer 104 to the generation field 242*a* in the block header 242 of the scratch block. The physical address determined at block 602 may be copied into the physical address field 242*b*, and thus indicate that the logical blocks of data stored in this scratch block are associated with the target physical sector. Remaining fields in the block header may be zeroed out to indicate that the newly accessed scratch block does not, at this point, contain any data from a write command.

At block 608, the logical block manager 102 may update the lookup table 122 to include an entry that maps the specified LBA with to the newly allocated scratch block. For example, the specified LBA may stored in the logical block address column of the lookup table 122, and the identifier of the new scratch block may be stored in the scratch block number column.

Figure 7:
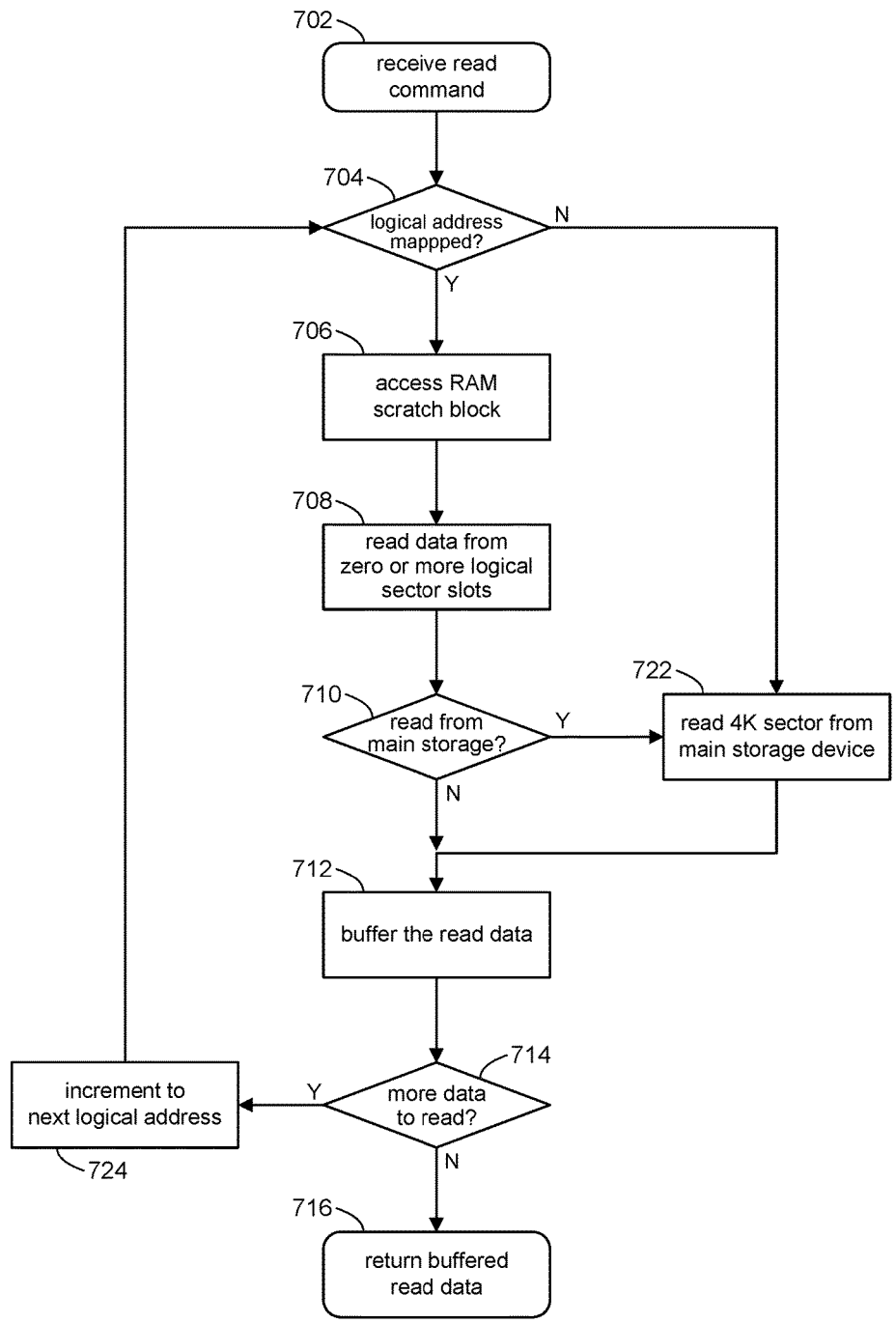
FIG. 7 illustrates a flow to process a read command in accordance with some embodiments of the present disclosure.

Referring to FIG. 7, the discussion will now turn to a high level description of processing in the logical block manager 102, and in particular the reader module 130, for processing a read command in accordance with the present disclosure. In some embodiments, for example, the logical block manager 102 may include computer executable program code, which when executed by a computer system (e.g., 902, FIG. 9), may cause the computer system to perform the processing in accordance with FIG. 7.

At block 702, the logical block manager 102 may receive a read command, for example, from application 12. The read command may include an LBA that specifies a starting logical sector to read from, and a block count of the number of logical sectors of data to read.

At block 704, the logical block manager 102 may determine whether or not the specified LBA is already mapped to a scratch block 204 in the RAM scratch buffer 104. Any data stored in the RAM scratch buffer 104 will be more recent than on the main storage device 16. Accordingly, the RAM scratch buffer 104 should be considered first, before accessing data from the main storage device 16. As explained above in connection with block 306 (FIG. 3), the determination may be made using the lookup table 122 depicted in FIG. 5. The logical block manager 102 may determine that the specified LBA is already mapped to a scratch block in the RAM scratch buffer 104 and proceed to block 722. On the other hand, the logical block manager 102 may determine that the specified LBA has not yet been mapped to a scratch block in the RAM scratch buffer 104 and proceed to block 706 in response.

At block 706, the logical block manager 102 may use the mapping provided in the lookup table 122 to access the scratch block from the RAM scratch buffer 104.

At block 708, the logical block manager 102 may read out data from any logical sector slots in the identified scratch block in RAM scratch buffer 104 that are associated with logical sectors covered by the specified LBA and the block count. Depending on which logical sectors were written prior to the read command and prior to being committed to main storage device 16, the logical block manager 102 may read zero, one, or more logical sector slots. An example may illustrate this point. Suppose logical sectors 1, 3 and 4 are written to the RAM scratch buffer 104, but have not yet been committed to main storage device 16. Consider a first read example, where a read command comes in specifying LBA 2 and a block count of 3; in other words, the read command is to read LBAs 2, 3, and 4. The logical block manager 102 would read the data for logical sectors 3 and 4 from corresponding logical sector slots in the RAM scratch buffer 104, but not data for logical sector 2. Consider a second read example, where a read command comes in specifying LBA 5 and a block count of 2; in other words, the read command is to read LBAs 5 and 6. In this example, the logical block manager 102 would not read any data from the RAM scratch buffer 104 because none of the logical sectors specified in the read command would have been written to the RAM scratch buffer 104.

At block 710, the logical block manager 102 may determine whether to read data from the main storage device 16. If any of the data to be read is not in the RAM scratch buffer 104, then the data must be read from the main storage device 16. Referring to the first read example above, data for logical sector 2 is not in the RAM scratch buffer 104, and in the second read example, data for logical sectors 5 and 6 are not in the RAM scratch buffer 104. These logical sectors must be read from the main storage device 16. The logical block manager 102 may determine it is necessary to read data from the main storage device 16 and proceed to block 722. On the other hand, the logical block manager 102 may determine it is not necessary to read data from the main storage device 16 and proceed to block 712.

At block 712, data read from the RAM scratch buffer 104 or from main storage device 16 may be buffered into a read buffer (not shown) to be eventually returned to the calling process (e.g., application 12) that invoked the read command. In some embodiments, for example, the invoking process may supply a pointer to the read buffer that the data can be stored in.

At block 714, the logical block manager 102 may determine whether or not more data needs to be read. In some embodiments, for example, the block counter from the read command may be decremented for each logical sector that is read, whether from RAM scratch buffer 104 (block 708) or from main storage device 16 (block 722). If the block count is not zero, then more data needs to be read to service the read command. The logical block manager 102 may determine that more data needs to be read and proceed to block 724. On the other hand, the logical block manager 102 may determine that all the data has been read and proceed to block 716.

At block 716, the logical block manager 102 may return the buffered read data to the invoking process. In some embodiments, for example, the logical block manager 102 may simply exit from the function call of the read command with a suitable return code At block 722, in response to a determination that some of the data to be read is not in a given scratch block (blocks 704 or 710), the logical block manager 102 may read the data from the main storage device 16. In some embodiments, for example, one or more physical sectors may be read from main storage device 16. Data corresponding to the targeted logical sectors can be read from those physical sectors and buffered (block 712).

At block 724, in response to a determination that more data needs to be read, the logical block manager 102 may increment the LBA by an amount equal to the number of logical sectors read in blocks 708 and 722, and decrement the block count by the same number. The logical block manager 102 may continue processing the read command from block 704.

Up to this point, the discussion relating to processing write commands from applications 12 has centered around storing the write data to the RAM scratch buffer 104 and the persistent scratch buffer 106. The final destination for the write data, however, is the main storage device 16. The discussion will now turn to a description of updating the main storage device 16 with write data from previously processed write commands.

Figure 8:
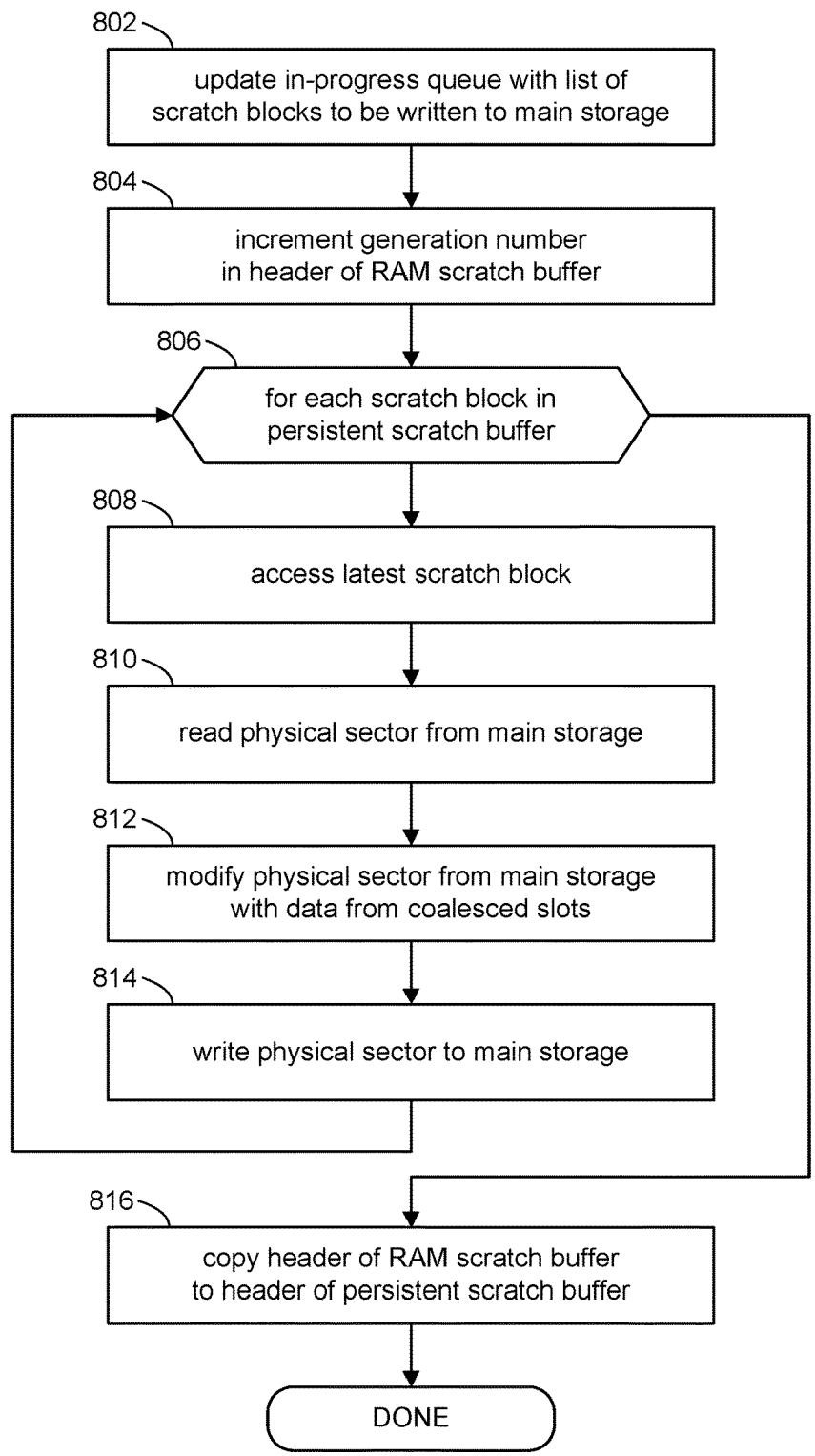
FIG. 8 illustrates a flow to process a round of updates to main storage in accordance with some embodiments of the present disclosure.

FIG. 8 shows a high level process flow in the logical block manager 102, and in particular the updater module 126, for processing a round of updates to store data from previously processed write commands to the main storage device 16 in accordance with the present disclosure. In some embodiments, for example, the logical block manager 102 may include computer executable program code, which when executed by a computer system (e.g., 902, FIG. 9), may cause the computer system to perform processing in accordance with FIG. 8.

At block 802, the logical block manager 102 may begin the current round of updates to the main storage device 16 by first compiling or gathering a list of outstanding scratch blocks in the persistent scratch buffer 106 which have data to be committed to main storage device 16. In some embodiments, for example, the outstanding scratch blocks 204 for the current round of updates may be identified using the "generation number." In accordance with the present disclosure, the generation number represents the current round of updates to main storage device 16 that is in progress.

Referring back to FIG. 2, the buffer header 202 portion of persistent scratch buffer 106 includes a generation field 222. The block header 242 in each scratch block 204, likewise, includes a generation field 242a, so that every scratch block 204 is associated with a generation number. At initialization before first use, the generation field 222 in the buffer header 202 of both the RAM scratch buffer 104 and persistent scratch buffer 106 may be initialized to '1' (generation 1), and the generation field 242a in the block header 242 of every scratch block 204 may be initialized to '0'.

All scratch blocks 204 whose generation number is the same as (or greater than) in the buffer header 202, are deemed to be outstanding scratch blocks containing data to be committed to main storage device 16. Scratch blocks 204 having a generation number less than in the buffer header 202 are deemed to have already been committed to main storage device 16. Scratch blocks that have already been committed may be reused for processing write commands (e.g., block 604, FIG. 6) that come in during the current round of updates to the main storage device 16.

At block 804, the logical block manager 102 may increment the generation number in the generation field 222 in the buffer header 202 of the RAM scratch block 104, after the in-progress queue 124 has been updated. Any new scratch blocks used to process write commands that come in during the current round of updates will be marked with the new (incremented) generation number and may be processed in the next round of updates.

At block 806, the logical block manager 102 may process each scratch block 204 in the persistent scratch buffer 106 that is identified in the in-progress queue 124. For each given scratch block, the logical block manager 102 may perform the following:

At block 808, the logical block manager 102 may look for any scratch block that is more recent than the given scratch block. For example, the logical block manager 102 can use the physical address field 242b to determine if there is another scratch block in the persistent scratch buffer 106 that is associated with the same physical sector as the given scratch block. If the generation number of that other scratch block is greater than in the given scratch block, then the given scratch block is ignored and processing continues with the other scratch block; otherwise, processing continues with the given scratch block.

At block 810, the logical block manager 102 may read the target physical sector in main storage device 16 that is associated with the given scratch block. For example, the data may be read into a buffer. This step represents the "read" operation of an RMW sequence. In the case where all eight logical sectors of the target physical sector have been modified, the logical block manager 102 can skip the read operation and proceed to block 812 since the entire physical sector will be overwritten.

At block 812, the logical block manager 102 may modify the buffer (block 814) with data contained in the logical sector slots of the given scratch block. This step represents the "modify" operation of an RMW sequence.

At block 814, the logical block manager 102 may write the data in the buffer (block 814) to the main storage device 16 to overwrite the target physical sector. This step represents the "write" operation of an RMW sequence. The logical block manager 102 may remove the given scratch block from the in-progress queue 124, and return to block 806 to repeat the process for another scratch block in the in-progress queue 124.

At block 816, the logical block manager 102 may write the buffer header 202 of the RAM scratch buffer 102 to the buffer header of the persistent scratch buffer 106, after all the scratch blocks in the in-progress queue 124 have been committed to main storage device 16. This effectively copies the generation number from the generation field 222 in the RAM scratch buffer 104 into the generation field 222 of the persistent scratch buffer 106. In some embodiments, for example, the logical block manager 102 may atomically overwrite the buffer header 202 of the persistent scratch buffer 106 with the content of the buffer header 202 of the RAM scratch buffer 104. By this single action, all the scratch blocks 204 in the persistent scratch buffer 106 become designated as having been committed to main storage device 16 because their generation numbers are now less than the generation number in the buffer header 202 of the persistent scratch buffer 106.

Each round of updates to the main storage device 16 may be spaced apart time-wise. Rounds of updates to the main storage device 16 may be performed periodically; for example at predetermined time intervals on the order of seconds, minutes, hours, etc. A round of updates may be triggered based on other criteria such as the number of unused scratch blocks 204 in either or both the RAM scratch buffer 104 and persistent scratch buffer 106. The number of write commands issued in a given period of time may serve as a criterion for triggering a round of updates. Disk usage is another criterion, and so on. A round of updates may be manually initiated, for example, by a system administrator.

Write commands to block-based storage media in accordance with the present disclosure can realize, from the point of view of the applications 12, response times that do not include the RMW time penalty when the write data comprise logical sector sizes that are smaller than the physical sector size of the block-based storage media. Although, actual updates to the block-based media may, in fact, require RMW sequences, the RAM scratch buffer 104 and persistent scratch buffer 106 mechanisms hide this fact from the applications 12 so they do not incur the RMW time penalty.

Aspects of the present disclosure protect against system crashes, and thus can maintain data consistency. For example, if a system crash occurs between rounds of updates, the system recovers simply by virtue of the generation number having already been incremented to the next generation. The logical block manager 102 simply processes scratch blocks based on the incremented generation number. If a system crash occurs during a round of updates to the main storage device 16, the generation number in the persistent scratch buffer 106 will continue to reflect the previous generation even though the generation number in the RAM scratch buffer 104 reflects the next generation. After restarting from the crash, the logical block manager 102 will pick up the latest scratch block for updating to the main storage device 16 (block 808).

Figure 9:
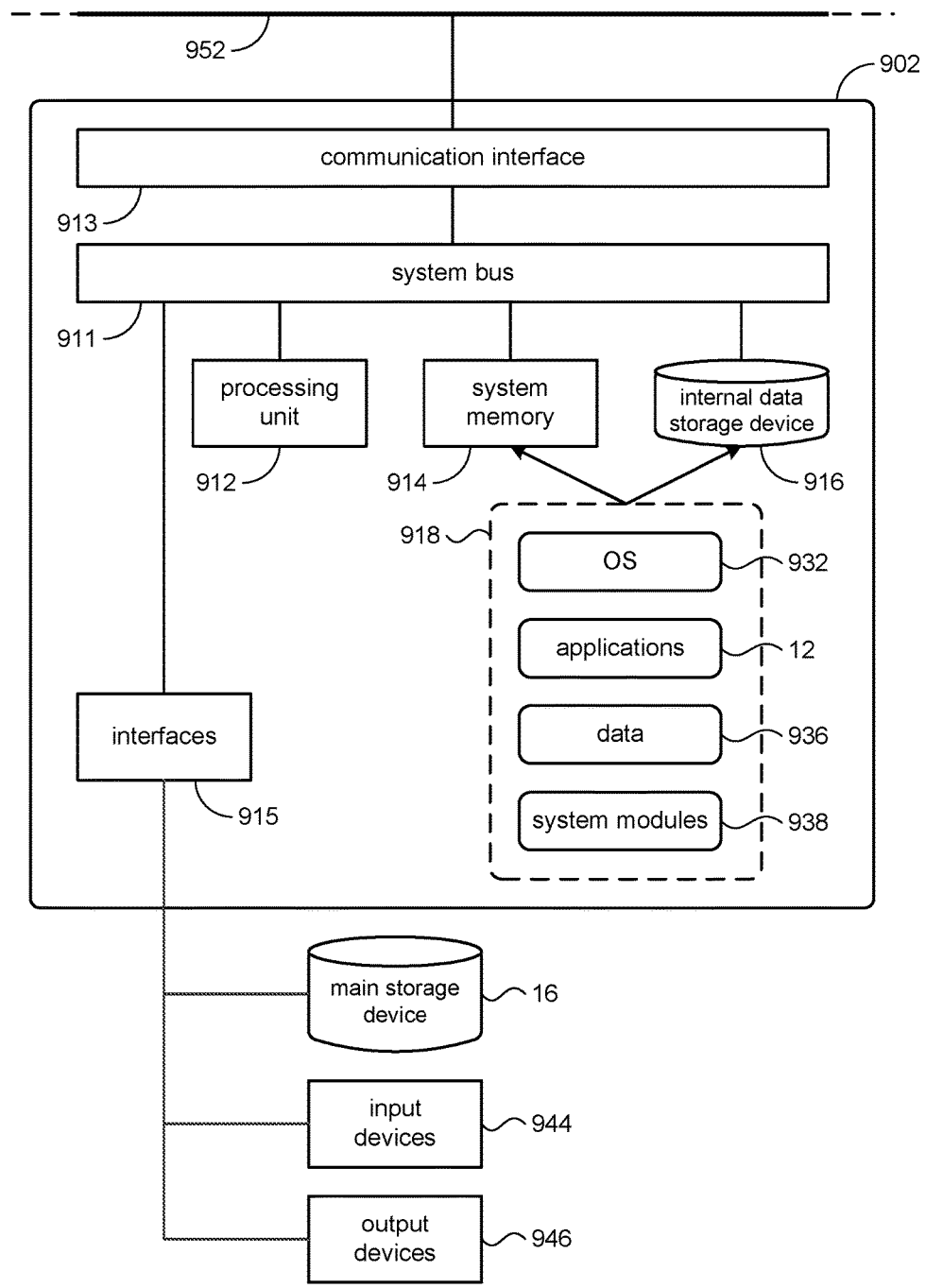
FIG. 9 illustrates components of a computing system in accordance with the present disclosure.

Referring to FIG. 9, an illustrative implementation of computing system 100 may include a computer system 902 having a processing unit 912, a system memory 914, and a system bus 911. The system bus 911 may connect various system components including, but not limited to, the processing unit 912, the system memory 914, an internal data storage device 916, and a communication interface 913.

The processing unit 912 may comprise a single-processor configuration, or may be a multi-processor architecture. The system memory 914 may include read-only memory (ROM) and random access memory (RAM). In some embodiments, the system memory 914 may include the RAM scratch buffer 104, lookup table 122, and in-progress queue 124.

The internal data storage device 916 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on). The internal data storage device 916 and its associated non-transitory computer-readable storage media provide nonvolatile storage of data, data structures, computer-executable instructions, and so forth. In some embodiments, the persistent scratch buffer 106 may be provided on the internal data storage device 916.

The system memory 914 and/or the internal data storage device 916 may store various program and data modules 918, including for example, operating system 932, one or more application programs 934, program data 936, and other program/system modules 938. For example, the system modules may include the logical block manager 102 components including updater module 126, writer module 128, and reader module 130.

Access to the computer system 902 may be provided by a suitable input device 944 (e.g., keyboard, mouse, touch pad, etc.) and a suitable output device 946, (e.g., display screen). In a configuration where the computer system 902 is a mobile device, input and output may be provided by a touch sensitive display.

The computer system 902 may operate in a networked environment using logical connections via wired and/or wireless communications to one or more remote computers (not shown) over a communication network 952. The communication network 952 may be a local area network (LAN) and/or larger networks, such as a wide area network (WAN).

The foregoing discussion revolved around emulating logical sectors in a block-based storage device having physical sectors larger in size (e.g., 4 KB) than the logical sector size (e.g., 512 B). Further aspects of the present disclosure include emulating logical sectors in a block-based storage device having physical sectors smaller in size (e.g., 512 B) than the logical sector size (e.g., 4 KB).

For example, the block header 202 in the RAM scratch buffer 104 and persistent scratch buffer 106 would include a checksum of the set of multiple actual physical sectors aggregated into a larger logical sector size. This allows for detection of a crash if the entire sector is committed. For example, suppose the physical sector size of the main storage is 512 B, and logical sector size for emulation is 4 KB. In this example, the scratch blocks in both the RAM scratch buffer 104 and the persistent scratch buffer 106 may comprise (8+1) 512 B data blocks. The first data block would contain the checksum of the other 8 data blocks (which comprise the logical sector being emulated). Though there is no guarantee that the data blocks will all be committed to main storage or only partially committed when a crash (e.g., power failure) occurs, that determination can be made by reading all 9 sectors from main storage after reset and verifying the checksum.

SUMMARY AND FURTHER DISCUSSION OF ASPECTS OF THE PRESENT DISCLOSURE

As mentioned above, devices with a native sector size of 4 KBytes are increasingly more popular over the last few years. However, the software slowly adapts to support the advanced format. Some of the operating systems are already on board, but multiple scenarios also require application changes and have complex compatibility issues in mixed configuration, upgrades, and VM migration between different hosts. Simpler solutions involve read-modify-write (RMW) operations, which are susceptible to a larger latency and lower throughput due to serialization. The present disclosure describes a solution to achieve similar resilience to unexpected failures as applications trust to get on 512 bytes physical sector sizes, while running on an advanced format media, with uncompromised performance. Unlike RMW, processing I/O in accordance with the present disclosure can provide similar latency as the physical device for writes if the storage is NVMe and it does not reach saturation. The mechanism is generic and it can be expanded to a variety of different logical and physical sizes, should they change in the future. Furthermore, embodiments in accordance with the present disclosure enables coexistence of partitions of multiple sector sizes, on the same physical media.

For the cases where transactions are not required, usually caches can avoid the overhead of RMW, by reducing the number of I/Os. For transactional application such as databases and file systems implementations, this is not really an option. If the persistence is not guaranteed when the application relies on it, corruptions and unpredictable execution can follow power failures or OS crashes. To guarantee that a write becomes persistent when a call completes, the write physically needs to be committed on the physical storage. If the sector size is smaller than physical size, the software reads first the original physical sector. It needs then to update the region containing the new data into the block. Lastly, it writes to the media the updated content. That write is also on physical sector boundary and size. The additional read operation likely triples the latency of the write I/O—in the assumption that the reads and writes have similar latency. In the worst-case scenario for HDDs, with competing I/Os from multiple threads, these operation may be additionally slower by causing additional seek. The novelty in the present disclosure relates to algorithms for accelerating the read-modify-write operations on NVMe devices using the same class of device or same physical device, with a low storage overhead and parity in performance as the regular aligned writes. In addition, the applicability of the approach to have fine granular sector size control in software using dual drive configuration is novel and relevant to the industry. Even though major operating systems support the current advanced format, there are compatibility and complications with applications that are not ready for that. Migrations of workloads add complexity of sector sizes change between source and destination host.

Embodiments in accordance with the present disclosure include auxiliary media (e.g., scratch buffers 104, 106) in addition to the original media (e.g., main storage device 16), to record transacted write operations. The original media should work exactly as before, and should guarantee consistency and resilience in case of crashes on logical sector size granularity. The auxiliary media (e.g., persistent scratch buffer 106) can be carved out from the original media, or can be separated by other means such as different device or different namespace on the same device. The auxiliary media should have a physical sector size larger than or equal to two logical sector sizes.

The solution involves a logical block management layer (e.g., 102) which tracks the in-progress operations, and has a caching benefit as well. The logical block management has a lazy writer facility (e.g., updater 126) to update on a different thread than the original media with the existing committed write operations. For a single queue device, this can interfere with the application I/Os. However, for NVMe devices, all these auxiliary operations can be issued on a different device queue concurrently.

The auxiliary storage is referred as a scratch media. All read/write operations may be brokered through the logical block management unit. No other entity should bypass the management unit to write/read directly with the media.

Scratch Media

The scratch storage may essentially e an extension of the main media to track additional operations, which did not make it to the main media yet. Nevertheless, both of them together, should reflect a consistent view of the media, with similar persistence guarantees as if the original media is 512 bytes sector size. For instance, it is possible that at any moment a physical sector on the original media does not have the latest 512 bytes sector content in place, but for sure, if the write call completed, that additional content should be on the scratch media. The state of the scratch media can be used to reconstruct entirely the state that was not yet committed to the main media. When the system is initialized after the reboot, the scratch media is parsed and fetched in the logic block management unit, which should reflect exactly the state that was committed.

In some sense, the scratch media may be viewed as a transactional log. It makes sure that for any logic sector write, the corresponding content is committed. In case of crashes, it is used to reconstruct the last consistent state. Nevertheless, it is not a "traditional" sequential log, being designed to minimize the footprint by:

Compacting the logical blocks that belong to the same physical block on the main media to be on a same physical sector on the scratch media. The same slot is updated for writes to the same logical block.

Actively reusing entries as soon as they are written back to the main media.

There is some flexibility in the usage of the scratch media and mapping to the main media. For instance, we can have multiple volumes, or multiple logical regions in the original media that can be handled, while the rest of the media is completely unmanaged by this mechanism. With some modifications, the disclosed processing can be implemented as a FS (file system) filter to provide file granularity.

The scratch media should have a full initialization before the first use. Essentially, it should be zeroed out completely.

The first physical page containing the segment information should be committed to the scratch media before the usage. The segment information contains several fields regarding the logical and physical sector size, the region or maybe the disk managed. Importantly, it may include a unique sequence number, which is used to atomically mark that a set of transactions are committed. That field is called "Generation" and represents the current generation of updates in progress.

Every block has a generation field as well. It can capture the generation of the block at the creation time. At initialization time, after a crash for instance, all blocks with generation number same as segment are deemed to be outstanding I/Os yet to be committed to the main media. Everything with a lower number are deemed to be already committed. The generation value is controlled by the lazy writer, as it will be described later.

Each block in the scratch media reflects a series of updates for one or more logical blocks on main. For 512 bytes logical sectors, a block contains a header that should be 512 as well, followed by up to 7 more logical 512 bytes sector updates. If the 8th sector write is required, for simplicity, a new block is linked to mark that update, and will be combined when the main storage is updated.

This mechanism handles partially written sectors. Otherwise, all I/Os that are 4K aligned and multiple of 4K in size with no overlap with a managed block can bypass this logic completely.

Since we want to pack densely multiple logical sectors, each block header contains a mapping from the relative position where the contents was written to the actual relative position in the main logical block.

Here is an example how it works. If we want to write the logical sector 2 with some data, the 4K boundary for physical sector size is 0. We allocate in the scratch media one block info structure, which will handle all the operations from the logical sector 0 to logical sector 7, all within the same 4 k physical block. The field "physical address" will be initialized with the 4 k lower bound sector number, 0 in this example. Inside the structure, we search if we already have an updated contents for the block 2. Since this is the first write, we do not have one, therefore we allocate the first available slot in our scratch block to store the contents. We update the LogicIndexMap[0] to contain the number 2. We write this 4 k block sector to the physical scratch media. Say now that the application writes the logical sector 7. The 4K block is still the same one, so we do not allocate another block. We use however the second index in the array to point to block seven (LogicIndexMap[1]=7). We copy the contents of this 7th sector to that 4K structure, and write it to the scratch media. This overwrites the previous update. At this point this block contains 2 updates for the same physical main sector. Now, suppose the application writes again to the same logical sector 2. The existing slot will be reused and content written over, followed by a physical update of the same block on the scratch media. In this scenario, the three initial writes will result in three writes to the scratch media and no reads/writes to the main media.

Let's assume that we want to write the sector 8. The 4K physical block is a new one, so we need to allocate a new block and do the same as above but for the new sector.

If the system crashes before the lazy writer updates, all the writes are already captured in a consistent state and can be recovered after reset.

Logic Block Management (e.g., Logic Block Manager 102, FIG. 1)

This component is in charge with maintaining a consistent state of the main storage for the upper layers. It can periodically update the main media with preserving the consistency requirements. It consists of a RAM mirror (RAM scratch buffer 104) of the scratch media, a lazy writer thread (updater module 128) and a lookup table (122) for the managed logical sectors.

All the updates are performed to RAM, and then a single write for the block to be updated is written to the scratch storage, synchronously. It also acts as a cache, returning right away the memory of a logical block without incurring any reads, if that block happens to be in memory. With the exception of the initialization when potential recovery needs to be performed, the scratch media is mostly used for writes, all necessary reads may be actually serviced from the main media and RAM mirror.

Lazy Writer (e.g., Writer Module 128, FIG. 1)

This thread may periodically update the main media for the outstanding operations. As soon as a block is available, the block can be queued to the writer thread, and based on some policy (time based, usage based, disk usage etc) can start updating the changes that were only on the scratch media. All reads and updates from the lazy writer to the main media are async I/Os and work well with multiple I/Os at the time. For instance, if the device is an NVMe with a queue depth of 1024, it is reasonable to initiate all 1024 updates at once, asynchronously. It starts first with issuing all the reads to fetch the original contents. If all eight logical sectors are to be updated in a physical 4 k boundary, reads are not even issued. Also for adjacent sectors, reads can be coalesced for efficiency.

When it starts processing, the lazy writer captures the entire queue of outstanding blocks, and increases the new generation number in the RAM mirror only. Any new block created after that point will go in the next queue and will have the new generation number in the header. When all the updates completed, the segment header is also written to the scratch media. This atomic write is effectively removing with that single operation all blocks previously committed from the scratch from further main media updates.

If the system crashes after the lazy writer finished the queue, then, after reset, the logic block management will pick up all the blocks with the GEN1, created after the lazy writer initiated the main updates. If the system crashes during the updates, the segment header of the scratch persistent media should reflect GEN0=GEN1-1. At reset/recovery time, it will pick up all the blocks from the scratch media with GEN0 and GEN1. It may attempt to merge the content if the point to the same sector, Gen1 having precedence to GEN0. It will use the earlier mechanism to attempt updating the main media again. It may optionally prevent any I/Os for the applications in this case to make easier getting to consistency before resuming as a normal usage. Some of the blocks might have been updated already on the main media before the crash. But the updates from the scratch media would have no effect because the same contents is there already.

Updating the Main Storage (e.g., Updater Module 126, FIG. 1)

The read and write operations to main media may be asynchronous. The mechanism provides a fine grain locking per block. When fields are updated or operations occur for the same physical blocks, they are all synchronized by that lock.

During this update, various operations can occur concurrently from the applications and operating system as well. Here are some relevant cases:

Write/read to an unrelated block. The update does not require any additional IO or info from the other blocks so no issues with this.

A read from a logical sector in the same block during update. If the block state is "pending-read", it will wait for completion of the existing read, and return the contents fetched. If the block is in the "pending-write" phase, the actual buffer to be written is available in memory and it will return it. If this happens after write completes, the block no longer in lookup table the read will be directly issued to the disk, similar with the case that this block does not have special handling.

A write to a logical sector during the update. If the state of the block is pending read, it will continue to update the existing scratch block and write to the scratch memory. Since the content of the scratch memory has not been updated yet, it will be picked up when the pending read completes and constructs the memory contents for the main storage update. If the write occurs during the pending write state, it will allocate a new scratch block containing only this new change and update the lookup table with this new block. It will still temporary keep a reference with the original block to be updated, to service additional reads or other operations until the write of the original block completes. This new block created will have a new generation number as explained earlier.

A fast lookup table implementation may be used to search for a given logical sector the scratch block maintaining the state. After a block is updated to the main media, the block space is released, and accordingly, the entry may be removed from the lookup table. The table is therefore not going to hold more that the number of scratch media blocks in the worst case scenario.

CONCLUSION

With the increase of availability of the NVM devices, new usage cases emerge by rethinking the storage algorithms in ways that leverage these capabilities. The present disclosure has introduced a relevant case where the performance was typically compromised for reliability to respect assumptions about the sector size: emulation of 512 bytes sector sizes on 4 Kbytes sector sizes media. The fast random access, high throughput and parallel execution capabilities of NVMe devices, allow achieving consistency without compromising performance.

Furthermore, the solution can be more granular than all or nothing option that we have today when the emulation is enforced to be the same for the entire device. It can be even as granular as file level, if used in the file system layer. It can for instance enable 512 bytes sector applications to run at full speed on an advanced format media, along with other 4Kn OS or other applications.

Finally, the NVM availability in a DIMM form factor looks like a very good scratch buffer option for this algorithm, considering the similar RAM/persistent storage mirror model.

While the present disclosure focused mostly on the a smaller logical to larger physical adapter, the mechanism can be extended with few modification to support the reversed emulation (4K over 512 physical) or even identical sector but with additional metadata stored at sector level such as checksum.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
receiving, from a sender, a first write command comprising write data and a write address that identifies a target logical sector in a block-based main storage device, the main storage device comprising a plurality of (M) physical sectors that define a plurality of (M×N) logical sectors, where N is the number of logical sectors in each physical sector;
processing the first write command by: (a) writing an address of a physical sector in the main storage device that contains the target logical sector to a header portion of a first scratch block stored in a byte-addressable storage separate from the block-based main storage device; (b) writing the write data to a slot among a plurality of slots in the first scratch block that is associated with the target logical sector, the slots being equal in size to the logical sectors; and (c) writing the first scratch block to a second scratch block stored in persistent storage; and
subsequent to processing the first write command, signaling a write completion response to the sender to indicate completion of the first write command.

2. The method of claim 1, wherein the persistent storage is a block-based storage device, the method further comprising processing the first write command without performing any read-modify-write sequences.

3. The method of claim 1, wherein a size of the write data in the first write command is not an integral multiple of the size of the physical sectors in the main storage device or not aligned to any physical sector in the main storage device.

4. The method of claim 1, further comprising: receiving a second write command comprising write data that is both aligned to a physical sector in the main storage device and has a size that is an integral multiple of the size of the physical sectors in the main storage device; and processing the second write command by writing directly to the main storage device instead of any scratch block in the byte-addressable storage or the persistent storage.

5. The method of claim 1, further comprising receiving a second write command directed to the same target logical sector as the first write command and processing the second write command by overwriting data the slot in the first scratch block that is associated with the target logical sector with write data of the second write command and writing the first scratch block to the second scratch block.

6. The method of claim 1, further comprising updating the main storage device with write data from previously processed write commands that are stored in one or more scratch blocks in the persistent storage.

7. The method of claim 6, wherein updating the main storage device includes combining the write data stored in one or more slots of a given scratch block in the persistent storage and writing the combined write data to a physical sector in the main storage device that is identified using the address stored in the header portion of the given scratch block.

8. The method of claim 7, wherein the number of the one or more slots in the given scratch block is less than N and writing the combined write data to the physical sector includes performing a read-modify-write sequence on the persistent storage.

9. The method of claim 7, wherein the number of the one or more slots in the given scratch block is equal to N, the method further comprising writing the combined write data to the physical sector without performing a read-modify-write sequence on the persistent storage.

10. The method of claim 6, further comprising updating the main storage device periodically, or based on disk usage, or based on a number of previously received write commands.

11. The method of claim 1, further comprising:
receiving a read command comprising a read address;
in response to a determination that the read address is associated with a given scratch block stored in the byte-addressable storage, processing the read command by accessing data in at least one slot of the given scratch block that corresponds to the read address and providing the accessed data as a response to the read command; and in response to a determination that the read address is not associated with any scratch block stored in the byte-addressable storage, processing the read command by accessing data from the main storage device using the read address and providing that data as a response to the read command.

12. A computer system comprising:
a computer processing unit;
memory having stored thereon computer-executable program code;
a byte-addressable storage;
a persistent storage; and
a block-based main storage device separate from the byte-addressable storage, the computer-executable program code, which when executed by the computer processing unit, causes the computer processing unit to:
receive, from a sender, a first write command comprising write data and a write address that identifies a target logical sector in the block-based main storage device, the main storage device comprising a plurality of (M) physical sectors that define a plurality of (M×N) logical sectors, where N is the number of logical sectors in each physical sector;
process the first write command by: (a) writing an address of a physical sector in the main storage device that contains the target logical sector to a header portion of a first scratch block stored in the byte-addressable storage; (b) writing the write data to a slot among a plurality of slots in the first scratch block that is associated with the target logical sector, the slots being equal in size to the logical sectors; and (c) writing the first scratch block to a second scratch block stored in the persistent storage; and
subsequent to processing the first write command, signal a write completion response to the sender to indicate completion of the first write command.

13. The computer system of claim 12, wherein the computer processing unit processes the first write command without performing any read-modify-write sequences.

14. The computer system of claim 12, wherein the memory is a random access memory (RAM), wherein the byte-addressable storage is a portion of the memory and the persistent storage is an NVMe storage device.

15. The computer system of claim 12, wherein the persistent storage is a portion of the main storage device.

16. The computer system of claim 12, wherein the persistent storage is a block-based storage device separate from the main storage device.

17. The computer system of claim 12, wherein the size of each slot is 512 bytes and the size of each physical sector is 4 KB.

18. A non-transitory computer-readable storage medium having stored thereon computer executable instructions, which when executed by a computer device, cause the computer device to:
receive, from a sender, a first write command comprising write data and a write address that identifies a target logical sector in a block-based main storage device, the main storage device comprising a plurality of (M) physical sectors that define a plurality of (M×N) logical sectors, where N is the number of logical sectors in each physical sector;
process the first write command by: (a) writing an address of a physical sector in the main storage device that contains the target logical sector to a header portion of a first scratch block stored in a byte-addressable storage that is separate from the block-based main storage device; (b) writing the write data to a slot among a plurality of slots in the first scratch block that is associated with the target logical sector, the slots being equal in size to the logical sectors; and (c) writing the first scratch block to a second scratch block stored in persistent storage; and
subsequent to processing the first write command, signal a write completion response to the sender to indicate completion of the first write command.

19. The non-transitory computer-readable storage medium of claim 18, wherein the first write command is processed without performing any read-modify-write sequences.

20. The non-transitory computer-readable storage medium of claim 18, further comprising computer executable instructions, which when executed by a computer device, cause the computer device to update the main storage device with write data from previously processed write commands that are stored in one or more scratch blocks in the persistent storage.

* * * * *